United States Patent Office 3,196,919
Patented July 27, 1965

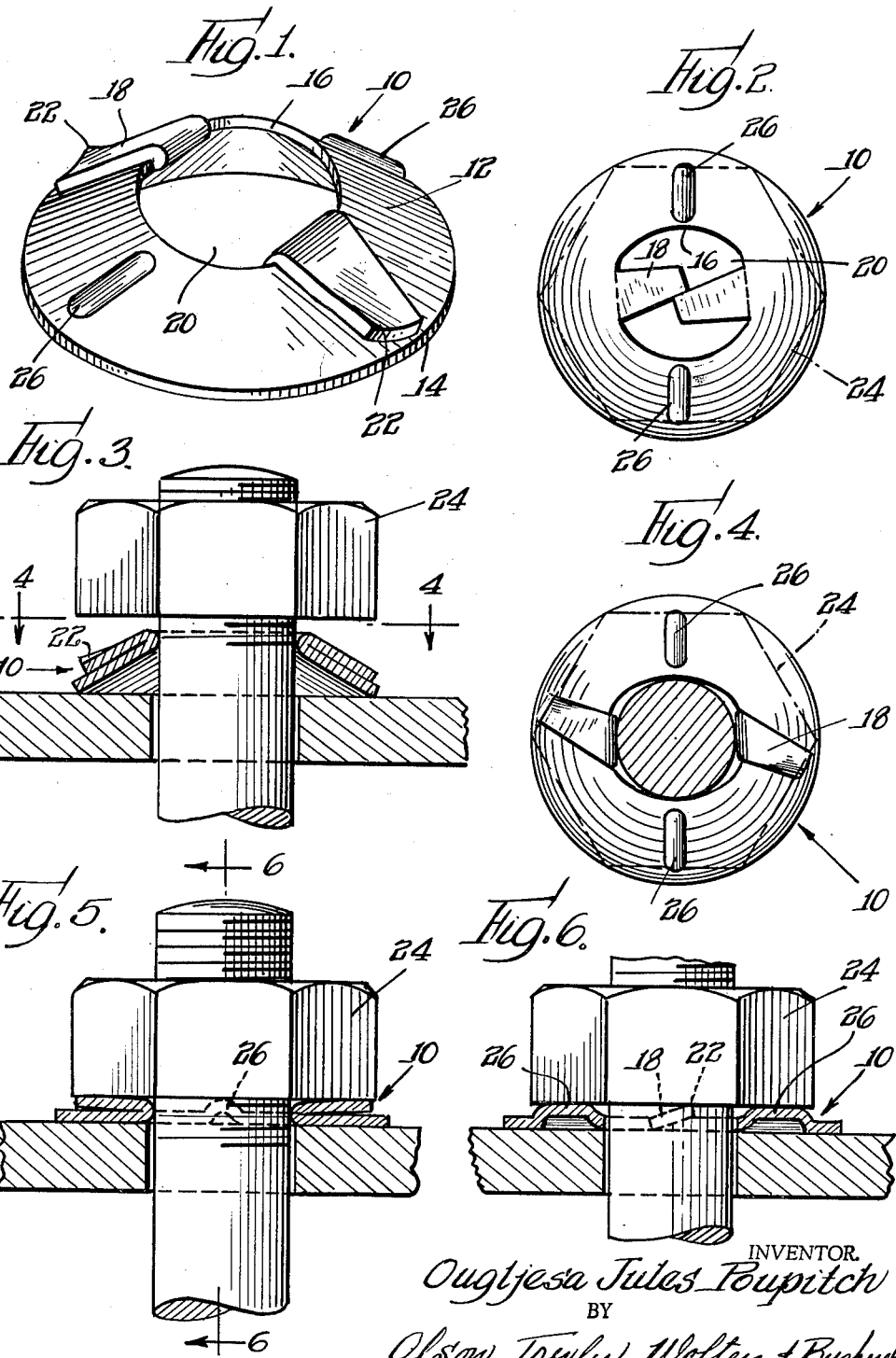

3,196,919
LOCKWASHER
Ougljesa Jules Poupitch, Itasca, Ill., assignor to Illinois Tool Works Inc., Chicago, Ill., a corporation of Delaware
Filed Feb. 11, 1963, Ser. No. 257,551
3 Claims. (Cl. 151—38)

This invention relates generally to lockwashers and more particularly to lockwashers of the sheet metal type in which locking teeth or prongs are formed from a portion of the sheet stock normally considered to be scrap metal, as for example the material which is struck from the sheet metal stock to provide the central aperture of the washer.

In the production of sheet metal washers it has been the common practice to punch a screw accommodating aperture, and the material thus struck out is scrap. It will thus be apparent that it would be advantageous to employ at least a portion of this normally punched out material for a useful purpose. The present invention therefore contemplates using such material to increase the locking effectiveness of the washer. More specifically, the invention contemplates so forming the central aperture of a washer as to present at least a pair of prongs which may be deflected from the center of the washer into operative association with the washer body in such a manner as to provide locking teeth.

Still more specifically, it is an object of the present invention to obtain the increased locking effectiveness of the washer by shifting a certain portion of the material normally used for scrap through substantially 180° so as to cause this material to adjacently superimpose the annular body of the washer.

It is another object of the present invention to increase the locking effectiveness of a dished-type washer by utilizing material at the center thereof normally thrown away as scrap.

Still more specifically, the invention contemplates lockwashers of the type referred to above wherein means is provided to counteract the tendency for locking teeth to be completely flattened when the washer is finally tightened against a work surface.

The foregoing, and other objects and advantages will be more apparent from the following detailed description, when considered in connection with the accompanying drawing wherein:

FIG. 1 is a perspective view of a dished or conical lockwasher which is representative of one embodiment of my invention;

FIG. 2 is a plan view of the washer of FIG. 1 before the locking prongs thereof have been deflected from their central position to the position shown in FIG. 1;

FIG. 3 is a fragmentary vertical sectional view of the lockwasher of FIG. 1 associated with a clamping nut, prior to the clamping engagement of the nut with the washer;

FIG. 4 is a fragmentary horizontal sectional view taken substantially along the line 4—4 of FIG. 3;

FIG. 5 is a fragmentary vertical sectional view similar to FIG. 3 showing the washer in its finally clamped position; and FIG. 6 is a view similar to FIG. 5 taken substantially along the line 6—6 of FIG. 5.

Referring now to the drawing wherein like numerals have been employed to designate similar parts throughout the various figures, one embodiment of the invention is illustrated in the lockwasher designated generally by the numeral 10. This lockwasher is of the dished or conical type having an annular body 12 of frustoconical form. The outer margin of the body 12 is indicated by the numeral 14 and the inner margin by the numeral 16. Particular attention is directed to a pair of oppositely disposed prongs 18 formed integral with and extending from the inner margin 16 of the body 12.

In FIG. 2 these prongs 18 are illustrated in the positions which they occupy before being deflected or bent through 180° so as to occupy the position shown in FIG. 1. It will be noted that the prongs 18 as shown in FIG. 2 comprise a portion of the material at the center of the washer, stock which is normally considered as scrap material. Thus in blanking out the center of the stock to provide the washer aperture 20, sufficient sheet metal stock is retained to provide the prongs 18.

Before shifting the prong material 18 into the position shown in FIG. 1, wherein these prongs traverse and adjacently superimpose one side of the body 12, it is preferable to impart a twist or deflection to the prongs so as to present work engaging or locking teeth 22, best seen in FIGS. 1 and 2. Thus after the warped or twisted prongs 18 have been folded through 180° from the position shown in FIG. 2, these teeth 22 are positioned so as to lockingly impinge the clamping surface of a screw head or nut member 24 when said member is finally tightened against the washer as shown in FIGS. 5 and 6. The washer is then heat treated to impart the required degree of hardness.

The structural arrangement just described makes it possible for two very powerful locking forces to be brought into play. One force is that established by the frustoconical body 12 in resisting the clamping force of the nut member 24, and the other force is brought into action when the washer is completely flattened to the position shown in FIGS. 5 and 6. In this latter position the locking teeth 22 serve to bite into the clamping surface of the nut to resist unauthorized loosening.

When the clamping nut 24 is tightened to the position shown in FIG. 5, there is a tendency for the axially deflected teeth 22 to be completely flattened and thus rendered less effective as locking elements. To counteract the tendency of completely flattening the teeth 22, abutment means 26 are provided. In the disclosed embodiment, these abutments consist of ribs formed by indenting the under side of the body 12. These ribs extend radially of the body and project axially from the body surface by an amount sufficient to counteract tendency for the locking teeth 22 to become completely flattened as seen in FIGS. 5 and 6.

From the foregoing, it will be apparent that the present invention contemplates a lockwasher of extremely simple construction possessing unusually effective increased locking capabilities. Dished or conical washers have been in use for many years but applicant's invention contemplates, in association with dished or conical washer bodies, locking teeth formed from material normally discarded as scrap. By having the locking teeth carried by prongs superimposing the washer body and formed integral with the inner margin thereof a very positive rigid locking structure is provided. Tests to which washers of the type disclosed herein have been subjected, verify the improved locking efficiency of washers constructed in accordance with the teachings of the present invention. Obviously the invention is not limited to the specific structural details disclosed herein, but contemplates other modifications and changes without departing from the scope of the present invention.

The invention is claimed as follows:

1. A sheet metal lockwasher adapted to be utilized with the shank of a fastener, said lockwasher including an annular body portion of frusto-conical shape, a central opening in the body portion having a diameter substantially equal to that of the fastener shank with which the washer is adapted to be used, prongs formed integral with and extending from the margin of said body portion defining said central opening, said prongs being folded along a line adjacent and substantially parallel to said margin and traversing and adjacently superimposing the outer surface of said body portion, the corresponding extremity at the free end of each prong being deflected to project axially above the opposite extremity of said free ends so as to present locking teeth adapted to lockingly engage a clamping surface tightened thereagainst when the washer body is flattened, abutment means formed integral with and extending axially outwardly from the surface of the frusto-conical washer body superimposed by the prongs by an amount sufficient to counteract the tendency for said locking teeth to become flattened when the washer is finally tightened against a workpiece.

2. A sheet metal lockwasher as set forth in claim 1 wherein the prongs are disposed diametrically opposite from each other and the abutment means are disposed intermediate said prongs.

3. A sheet metal lockwasher as set forth in claim 1 wherein the prongs are diametrically disposed and extend in a generally radial direction across and adjacent the outer surface of the washer body, said teeth at the free ends of the prongs being positioned in the vicinity of the outer margin of the washer body.

References Cited by the Examiner

UNITED STATES PATENTS

| 443,911 | 12/90 | Fletcher | 85—50 |
| 2,675,844 | 4/54 | Knohl | 151—35 |

FOREIGN PATENTS

| 842,560 | 6/52 | Germany. |

CARL W. TOMLIN, *Primary Examiner.*